United States Patent [19]
Partridge, Jr. et al.

[11] 3,755,118
[45] Aug. 28, 1973

[54] PROCESS FOR PREPARING LOGANIN AND ANALOGS THEREOF

[76] Inventors: John Joseph Partridge, Jr., 77 Orange Rd., Montclair, N.J. 07042; Milan Radoje Uskokovic, 7 Windermere Rd., Upper Montclair, N.J. 07043

[22] Filed: Jan. 5, 1970

[21] Appl. No.: 845

[52] U.S. Cl....... 204/158 R, 260/210 R, 260/345.2, 260/456 P, 260/456 R, 260/563 R, 260/598, 260/609 F, 260/611 A, 260/611 R, 260/666
[51] Int. Cl............................ C07c 47/8, B01j 1/10
[58] Field of Search ............................... 204/158 R; 260/210 R, 345.2

[56] References Cited
UNITED STATES PATENTS
3,089,877  5/1963  Korte et al...................... 260/345.2
3,154,565  10/1964  Linn et al. ........................ 260/345.2

*Primary Examiner*—Lewis Gotts
*Assistant Examiner*—Johnnie R. Brown
*Attorney*—Samuel L. Welt, Jon S. Saxe, Bernard S. Leon and William G. Isgro

[57] ABSTRACT

The present invention relates to a process for the preparation of loganin and analogs thereof. Loganin and analogs thereof are useful in the preparation of alkaloids.

6 Claims, No Drawings

PROCESS FOR PREPARING LOGANIN AND ANALOGS THEREOF

DETAILED DESCRIPTION OF THE INVENTION

The substance loganin was first isolated from the fruit of Strychnos nux vomica. Later, it was also found to occur in Strychnos lucida and in the water plant Menyanthes trifoliata. More recently, researchers have found that loganin is present in the Vinca rosea plant. This last-mentioned finding has led to the discovery that loganin and analogs thereof are precursors in the biosynthetic preparation of the Corynanthe, Aspidosperma and Iboga groups of indole alkaloids.

As is evident from the above, the prime source of loganin heretofore was from plant matter. It should be obvious that obtaining loganin and analogs thereof thusly required a complex tedious technique involving time-consuming extraction procedures. Also, this type of procedure suffers from the additional defect of low yields. In order to fully realize the valuable capability of loganin and analogs thereof to be converted into indole alkaloids, it is evident that a total synthesis of such intrinsically important substances utilizing readily available starting materials would be of substantial benefit to the art.

It is a primary object of the present invention to provide facile total synthetic routes leading to loganin and analogs thereof which require only starting materials readily available in commerce and which result in the desired products in good yields. Additional objects within the purview of the present invention will become apparent from the detailed description set forth hereinafter and in the appended claims.

One particularly salient process aspect of the present invention can be illustrated diagrammatically by the following flow sheet.

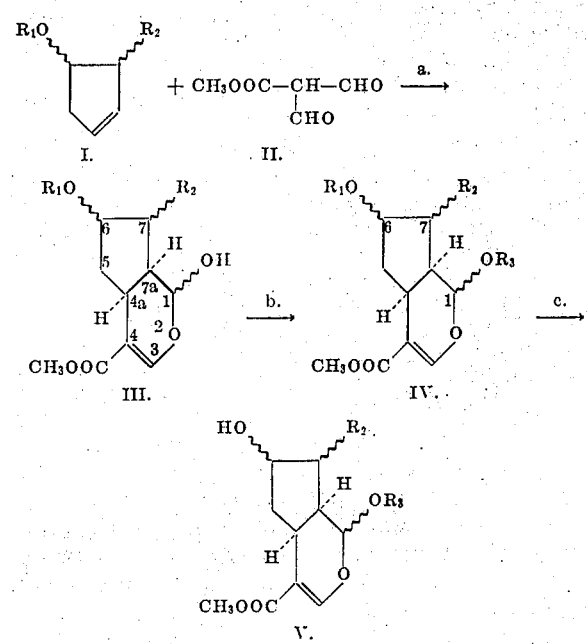

The characters R as utilized in the above flow sheet have the following significance.

$R_1$ represents hydrogen, acyl, ar-lower alkyl, tetrahydropyranyl, benzenesulfonyl or substituted derivatives thereof and lower alkylsulfonyl. $R_1$ is preferably hydrogen, acyl, preferably lower alkanoyl, most preferably acetyl and tetrahydropyranyl.

$R_2$ represents hydrogen, lower alkyl, a $-CH_2-O-R_{12}$ group, a $CH_2-S-R_{12}$ or a $CH_2-O-SO_2-R_{12}$ group wherein each $R_{12}$ is selected from the group consisting of lower alkyl, aryl, and ar-lower alkyl and the grouping

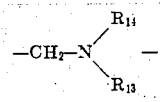

wherein $R_{13}$ and $R_{14}$ are each selected from the group consisting of hydrogen and lower alkyl. $R_2$ is preferably selected from the group consisting of hydrogen, lower alkyl, most preferably methyl or a $CH_2-O$–lower alkyl group, most preferably a $-CH_2-O-CH_3$ grouping.

$R_3$ is selected from the group consisting of lower alkyl, ar-lower alkyl, tetraacetylglucopyranosyl and glucopyranosyl. $R_3$ is preferably lower alkyl, most preferably, methyl, tetraacetylglucopyranosyl and glucopyranosyl.

By the term "lower alkyl" as utilized herein either alone or in combination with another grouping, there is intended both straight and branched chain $C_1-C_7$, most preferably $C_1-C_4$ hydrocarbon groups such as methyl, ethyl, propyl, butyl, pentyl hexyl, heptyl and the like. By the term "acyl" as utilized herein, there is intended the acyl moiety of a carboxylic acid. A preferred acyl group is the acyl moiety of a lower alkanoic acid such as acetyl, propionyl, butyryl, isobutyryl and the like. Also preferred is the acyl moiety of a phenyl carboxylic acid such as benzoyl, substituted benzoyl, e.g., halobenzoyl, (o-chlorobenzoyl), lower alkylbenzoyl, (p-methylbenzoyl) and the like.

The term "aryl" and the like as utilized herein either alone or in combination connotes preferably a substance containing an aromatic hydrocarbon ring nucleus of six carbon atoms. Thus, by the term "aryl" there is intended a phenyl group or a substituted phenyl group such as tolyl, p-halophenyl and the like. The term "ar-alkyl" similarly connotes groups such as phenyl-lower alkyl, e.g., benzyl, phenylpropyl, phenylbutyl and the like, or substituted derivatives thereof such as p-methylbenzyl, chlorobenzyl, chlorophenylpropyl, methylphenylbutyl and the like.

The radical, $-CH_2-S-R_{12}$ may be represented by $CH_3-S-CH_2-$, phenyl-$S-CH_2-$ and benzyl-$S-CH_2-$.

The radical $-CH_2-O-SO_2-R_{12}$ may be represented by mesyl-$O-CH_2-$, benzenesulfonyl-$O-CH_2-$ and tosyl-$O-CH_2-$ and the like. The radical

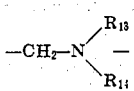

may be represented by diethylamino-$CH_2$, dimethylamino-$CH_2$, methylamino-$CH_2$, ethylamino-$CH_2$, propylamino-$CH_2$ and the like.

The expression "benzylsulfonyl" connotes a group such as benzenesulfonyl per se or a substituted derivative thereof such as tosyl. The term "lower alkylsulfonyl" comprehends a group such as mesyl, ethylsulfonyl and the like.

In the first stage of the process illustrated diagrammatically above, a 3,4-substituted cyclopentene or 4-substituted, 3-unsubstituted cyclopentene of the formula I is reacted with methyl diformylacetate. In a preferred mode of carrying out this process step, the compound of the formula I is added to a compound of the formula II and the resultant mixture is photolytically treated, e.g., irradiated with ultraviolet light. By this convenient single-step preparative approach, the formation of the bicyclic compound of the formula III results.

In the next process step, the 1-hydroxy group of the compound of the formula III is etherified. Etherification of a compound of the formula III above whereby to obtain the corresponding compound of the formula IV wherein $R_3$ is tetraacetylglucopyranosyl may be conveniently accomplished by treating a solution of a compound of the formula III above with acetobromglucose in the presence of an HBr acceptor such as pyridine or any similar type HBr acceptor, for example, dimethylformamide, a tertiary amine, picoline, silver carbonate, silver oxide, silver nitrate and the like.

In one process embodiment, the HBr acceptor, where appropriate, can also serve as the solvent medium in which the reaction is conducted. Thus, by the convenient expedient of providing the acid acceptor to the reaction zone in excessive amounts, the acceptor can serve the dual function of both HBr acceptor and reaction medium. Thus, for example, to a solution of a compound of the formula III above in pyridine, there is added acetobromglucose. By proceeding accordingly, there is obtained a compound of the formula IV wherein $R_3$ is tetraacetylglucopyranosyl.

In an alternate process aspect, an inert organic solvent such as tetrahydrofuran, diethyl ether, a hydrocarbon such as benzene, toluene, p-halobenzene, dichloromethane and the like can perform as the reaction medium. Thus, in this embodiment, a compound of the formula III is added to any of such inert organic solvents and to the resultant medium, an HBr acceptor and acetobromglucose is added.

In a preferred process aspect, according to prior art techniques, the compound of the formula III is added to an inert organic solvent such as chloroform, ethers such as tetrahydrofuran, a hydrocarbon such as benzene and to the resultant medium is added acetobromglucose, an HBr acceptor such as silver carbonate, silver oxide or silver nitrate, a drying agent such as calcium sulfate or calcium carbonate and a promotor such as iodine. There is obtained thusly a compound of the formula III wherein $R_3$ is tetraacetylglucopyranosyl.

The so-prepared compound of the formula IV wherein $R_3$ is tetraacetylglucopyranosyl can be converted into the corresponding compound of the formula IV wherein $R_3$ is glucopyranosyl by treating the former with any suitable base capable of deacetylating the tetraacetylglucopyranosyl group. Suitable bases include alkali metal hydroxides such as sodium hydroxide. The deacetylation is preferably effected at temperatures below room temperature. When proceeding accordingly, it may be noted that there is also obtained the corresponding compound of the formula V which contains a hydroxy group in position-6 and $R_3$ as glucopyranosyl.

Etherification of a compound of the formula III above to the corresponding compound of the formula IV wherein $R_3$ is lower alkyl or ar-lower alkyl may be conveniently accomplished by permitting, respectively, a lower alkanol solution or an ar-lower alkanol solution of a compound of the formula III to stand over a period of several hours. For example, the 1-methyl ether of the formula IV, i.e., a compound of the formula IV wherein $R_3$ is lower alkyl, may be conveniently prepared by adding a compound of the formula III to appropriate amounts of methanol and then permitting the so-obtained medium to stand. Similarly, the ethyl ether can be prepared via the use of ethanol and the propyl ether can be prepaed via the use of propanol. The ar-lower alkyl ether such as the benzyl ether, or the substituted benzyl ether, i.e., wherein $R_3$ is ar-lower alkyl, can be conveniently prepared by forming a solution of the compound of the formula III in benzyl alcohol or a substituted benzyl alcohol and the like and then permitting the reaction to stand. Conveniently, the reaction is conducted in the presence of an acid catalyst. Acid catalysts suitable for this purpose can include organic acids such as para-toluenesulfonic acid, inorganic acids such as sulfuric acid, an acid form of an ion exchange resin such as Amberlite A sulfonated styrene-divinyl benzene copolymeric ion exchange resin, an aprotic Lewis acid such as boron trifluoride or any equivalent acid agent. The artisan will recognize a multitude of acid agents suitable for the purposes of the present invention. Any acid agent which is suitable for the purposes of this process step is included within the purview of the present invention.

The preparation of a compound of the formula V from the corresponding compound of the formula IV can be effected by any suitable removal system capable of selectively removing the $R_1$ group in position-6 of the compound of the formula IV when $R_1$ is other than hydrogen (i.e., leaving the ether group in position-1 uneffected by the reaction conditions employed) and converting it into the 6-hydroxy group of the compound of the formula V. Any suitable reagent system capable of selectively removing a blocking group, if present in position-6, while permitting the ether group in position-1 of a compound of the formula IV to remain uneffected by the reaction conditions, is suitable for the purposes of the present invention. A preferred removal system wherein $R_3$ is lower alkyl or ar-lower alkyl is the same system that was utilized to effect conversion of a compound of the formula III to the corresponding compound of the formula IV wherein $R_3$ is lower alkyl or ar-lower alkyl, i.e., an alcohol and an acid catalyst. Thus, in one process aspect, the reaction can be permitted to proceed for an extended period of time so that etherification to a compound wherein $R_3$ is lower alkyl or ar-lower alkyl and removal of the blocking group $R_1$ (i.e., a group other than hydrogen) can be conveniently effected by a single reagent system.

As is evident from the above, therefore, in one process embodiment, the conversion of a compound of the formula III to the corresponding compound of the formula V wherein $R_3$ is lower alkyl or ar-lower alkyl can be performed without isolating the corresponding intermediate of the formula IV. In achieving this objective, the compound of the formula IV wherein $R_3$ is lower alkyl or ar-lower alkyl is prepared from the corresponding compound of the formula III in accordance with the technique described above and the reaction is not interrupted so that the corresponding compound of the formula V is ultimately obtained. In proceeding accordingly, the compound of the formula III is converted into the corresponding compound of the formula IV and the so-obtained compound is converted into a compound of the formula V wherein $R_3$ is lower alkyl and ar-lower alkyl without isolating the said compound of the formula IV or interrupting the reaction. Thus, by the utilization of more energetic reaction conditions, e.g., by permitting the reaction to stand for longer periods of time than when the compound of the formula IV per se is desired, a compound of the formula III can be converted to a compound of the formula V via the intermediate of the formula IV in a single reaction batch.

Similarly, the removal of a blocking group at $R_1$ may also be effected when $R_3$ is tetraacetylglucopyranosyl or glucopyranosyl by conventional technqiues. For example, when $R_3$ is tetraacetylglucopyranosyl and $R_1$ is tetrahydropyranyl in a compound of the formula IV, removal of the $R_1$ blocking group is effected by treatment with an acid agent such as p-toluenesulfonic acid for a short period of time e.g. less than an hour at room temperature and below, yielding a compound of the formula V wherein $R_3$ is tetraacetylglucopyranosyl. The so-obtained compound can be converted into the corresponding compound of the formula V wherein $R_3$ is glucopyranosyl by treatment with base such as sodium hydroxide. When $R_1$ is ar-lower alkyl in compounds of the formula IV containing such substituents at $R_3$, it can also be removed by conventional techniques such as by hydrogenation with Raney nickel at low temperatures, e.g., below room temperature.

Treatment of a compound of the formula IV with base wherein $R_3$ is tetraacetylglucopyranosyl and $R_1$ is acyl will result in removal of the acyl group at $R_1$ and the conversion of the tetraacetylglucopyranosyl group at $R_3$ to the glucopyranosyl group at the corresponding position.

By the convenient routes described above loganin and anlogs thereof are obtained which are utilized in the biosynthetic pathway to valuable indole alkaloids.

Loganin and the analogs thereof of the formula V above according to the literature are converted, as they proceed along the biosynthetic pathway to indole alkaloids, to intermediate compounds of the formula

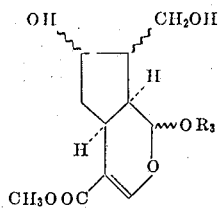

VIII wherein $R_3$ is as above.

The last-mentioned compounds thus are also useful in the preparation of indole alkaloids.

In the first stage of converting a compound of the formula V to the corresponding compound of the formula VIII, a compound of the formula V is subjected to oxidation conditions whereby to prepare a compound of the formula

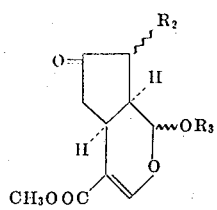

VI wherein $R_2$ and $R_3$ are as above.

The oxidation is conveniently effected with a strong oxidizing agent such as dipyridine chromium (VI) oxide or chromic acid. When utilizing chromic acid as the oxidizing agent, the reaction is conveniently effected by dissolving the compound of the formula V in acetone or a similar inert organic solvent, adding to the resultant solution a solution containing chromic acid dissolved in a strong aqueous acid such as aqueous acetic acid or aqueous sulfuric acid and allowing the mixture to react at substantially room temperature for a period of several hours. In an alternate embodiment, the compound of the formula V is dissolved in a solution of dipyridine chromium oxide in an inert organic solvent such as a halogentated aliphatic hydrocarbon, e.g., methylene chloride, trichloromethane and the like or a halogenated aromatic hydrocarbon such as chlorobenzene or an ether such as tetrahydrofuran and the like. The resultant mixture is permitted to stand preferably at temperatures below room temperature over a period of several hours. Particularly preferred among the class of compounds represented by the formula VI above are those compounds wherein $R_2$ is hydrogen, methyl or methoxymethylene.

In one process aspect in the route from a compound of the formula VI to the corresponding compound of the formula VIII, a compound of the formula VI wherein $R_2$ is hyrogen is converted into the corresponding compound of the formula

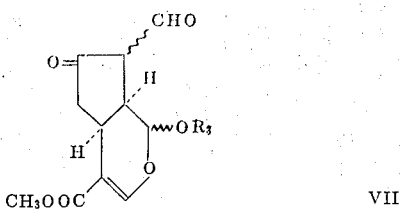

VII wherein $R_3$ is as above.

The preparation of a compound of the formula VII containing an aldehyde group in position-7 is conveniently effected by treating the corresponding compound of the formula VI wherein $R_2$ is hydrogen with a formyl group providing reagent system. In a preferred aspect, a compound of the formula VI wherein $R_2$ is hydrogen is dissolved in an inert organic solvent such as an aromatic hydrocarbon solvent, for example, benzene, toluene, halobenzene and the like, an ether such as diethyl ether, tetrahydrofuran and the like, and then adding to the resulting solution any suitable formyl group providing reagent system. In a preferred aspect, a lower alkyl formate, most preferentially, methyl formate, is utilized in the reagent system. Conveniently, a strongly basic substance is provided to the reaction zone and comprises a part of the last-mentioned system. In a preferred embodiment, the basic substance is an alkali metal lower alkoxide such as sodium tertiary amylate, sodium methoxide, sodium ethoxide, an alkali metal hydride such as sodium hydride, triphenylmethyl sodium and the like. By proceeding accordingly, formylation in position-7 of a compound of the formula VI wherein $R_2$ is hydrogen occurs.

The compounds of the formula VII above can be converted into the corresponding compounds of formula VIII above by a wide variety of procedures. For example, compounds of the formula VII above can be treated with a mild reducing agent so that reduction of the CHO group in position-7 to the $CH_2OH$ group can be conveniently selectively effected. Thus, the reduction can be effected by treating a compound of the formula VII above with a mild reducing agent such as a borohydride or any suitable reducing agent capable of reducing the formaldehyde group in position-7. The preferred reductants are alkli metal borohydrides, e.g., lithium borohydride, potassium borohydride and most preferably sodium borohydride. Other borohydrides such as alkaline earth metal borohydrides, e.g., calcium borohydride or aluminum borohydride may be used as well. Preferably an organic solvent such as ether, e.g., diethyl ether, a lower alkanol, e.g., methanol, ethanol and propanol, tetrahydrofuran and the like is employed as the reaction medium. The reduction may be carried out at room temperature or at an elevated temperature, if necessary, in an atmosphere of an inert gas such as nitrogen. However, it is preferred to effect the reduction at temperatures below room temperatures, e.g., at temperatures at from about −5° to about 10°C., most preferably at about 0°C.

Compounds of the formula VII above may also be converted into the corresponding compounds of the formula V above wherein $R_2$ is lower alkyl, preferably methyl. In this process aspect, a compound of the formula VII is reacted with N-lower alkane-thiol, a benzyl-thiol or a substituted benzylthiol or an arylthiol such as phenylthiol in the presence of a strong acid generating agent, whereby to obtain the corresponding compound of the formula

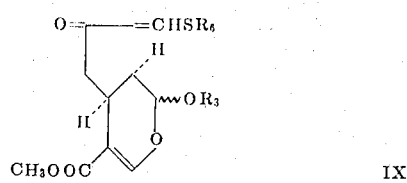

IX wherein $R_3$ is as above and $R_6$ is selected from the group consisting of lower alkyl, benzyl, substituted benzyl and aryl.

For example, suitable lower alkane thiols useable in the conversion of a compound of the formula VII into the corresponding compound of the formula IX include ethanethiol, propanethiol, butanethiol, tertiary butanethiol, pentanethiol and the like. Acid generating agent may be illustrated by sulfonic acid halides such as lower alkylsulfonyl halides, e.g., mesyl halide, p-toluenesulfonyl halide and the like. In the conversion of the compound of the formula VII to the corresponding compounds of the formula IX, any inert organic solvent suitable for the purposes of the present invention may be conveniently utilized. In a preferred embodiment, pyridine is utilized as the solvent medium but other solvent mediums such as tertiary amines, picoline and the like may also be employed with efficaciousness. Preferably the conversion of a compound of the formula VII to the corresponding compound of the formula IX is effected at room temperature or below. A preferred temperature range is from about −5° to about 20°, most preferably at about 0°C.

The compounds of the formula IX above may then be catalytically reduced with any convenient catalytic reducing agent in order to effect the conversion of the compounds of the formula IX into a compound of the formula

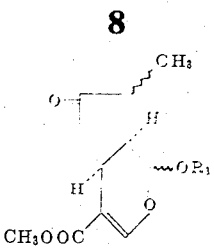

X wherein $R_3$ is as above.

The catalytic hydrogenation is suitably effected by adding a compound of the formula IX above to an inert organic solvent such as a lower alkanol, e.g., methanol, ethanol and the like and then adding to the so-formed solution a hydrogenation system such as Raney nickel, palladium-on-carbon, charcoal, platinum or any other nobel metal catalysts whereby removal of the $R_6$–S group is effected. The so-obtained compound of the formula X can then be converted into the corresponding compound of the formula V wherein $R_1$ is hydrogen by the use of mild reducing agents of the type identified more fully above, e.g., a borohydride such as sodium borohydride.

In another process aspect, compounds of the formula VIII can be prepared directly from compounds of the formula V above wherein $R_2$ is $CH_2$–O–lower alkyl by treating the last-mentioned compound with boron trihalide such as boron tribromide or boron trichloride according to prior art procedures.

Certain of the compounds illustrated above are novel and hence constitute a part of the present invention.

The following examples are illustrative but not limitative of the present invention. All temperatures stated therein are in degrees Centigrade.

EXAMPLE 1

A mixture of 140.0 g. (0.835 mole) of 4-(2-tetrahydropyranyloxy)cyclopentene and 27.1 g. (0.208 mole) of methyl diformylacetate was irradiated through a Pyrex filter with a 450 watt Hanovia mercury lamp for 141 hr. 4-(2-Tetrahydropyranyloxy)cyclopentene was recovered by distillation (b.p. 50°–55° at 0.06 mm). The distillation residue was chromatographed on silica gel to further purify the product.

IR spectrum in $CHCl_3$ (P.C. 76341): 3600 cm$^{-1}$ (OH), 3390 cm$^{-1}$ (OH), 1710 cm$^{-1}$ (C=O), 1635 cm$^{-1}$ (C=C).

NMR spectrum in $CDCl_3$ (P.C. 76341): δ 7.50 (s, –CH=), 3.72 (s, $CO_2CH_3$) ppm.

EXAMPLE 2

A mixture of 3.785 g. (0.030 mole) of 4-acetoxycyclopentene and 0.781 g. (0.0060 mole) of methyl diformylacetate was irradiated in a Pyrex tube for 105 hr. using a 450 watt Hanovia mercury lamp. 4-Acetoxycyclopentene was recovered upon distillation (b.p. 41°–42° at 10 mm). The product was further purified by preparative TLC.

IR spectrum in $CHCl_3$ (P.C. 77869): 3600 cm$^{-1}$ (OH), 3425 cm$^{-1}$ (OH), 1735 cm$^{-1}$ (C=O), 1710 cm$^{-1}$ (C=O), 1635 cm$^{-1}$ (C=C).

NMR spectrum in $CDCl_3$ (P.C. 77869): δ 7.53 (s, –CH=), 7.47 (s,–CH=), 3.73 (s,$CO_2CH_3$), 2.04 (s, $CH_3CO$), 2.00 (s, $CH_3CO$) ppm.

EXAMPLE 3

A mixture of 1.70 g. (0.010 mole) trans-4-acetoxy-3- methoxymethylcyclopentene and 0.130 g. (0.0010 mole) of methyl diformylacetate was irradiated in a Pyrex tube for 105 hr. using a 450 watt Hanovia mercury lamp. Trans-4-acetoxy-3- methoxymethylcyclopentene was recovered by distillation, b.p. 60°–70° at 10 mm (bath temperature). The product was further purified by preparative TLC.

IR spectrum in CHCl$_3$ (P.C. 77857): 3620 cm$^{-1}$ (OH), 3450 cm$^{-1}$ (OH), 1730 cm$^{-1}$ (C=O), 1705 cm$^{-1}$ (C=O), 1635 cm$^{-1}$ (C=C).

NMR spectrum in CDCl$_3$ (P.C. 77857): 7.32 (s, –CH=), 3.72 (s, CO$_2$CH$_3$), 3.44 (s, OCH$_3$), 3.35 (s, OCH$_3$), 3.33 (s, OCH$_3$), 2.03 (s, CH$_3$CO), 2.00 (s, CH$_3$CO), 1.98 (s, CH$_3$CO)ppm.

The starting material trans-4-acetoxy-3-methoxymethylcyclopentene can be prepared as follows:

To a solution of 40.25 gm. (0.500 mole) of chloromethyl methyl ether in 100 ml. of tetrahydrofuran at −55° was added ca. 0.500 mole of cyclopentadienyl sodium (11.50 gm. sodium, 35.00 gm. cyclopentadiene) in 130 ml. of tetrahydrofuran over a 1 hr. period. The mixture was stirred for 1 ½ hrs. at −55° yielding 5-methoxymethylcyclopentadiene. Then 90 ml. (0.090 mole) of 1M borane in tetrahydrofuran was added and the mixture was stirred at 0° for 16 hr. Approximately 200 ml. of tetrahydrofuran was removed under reduced pressure. Then 200 ml. of ether was added, the solution was cooled to 0° and 27 ml. of 3N sodium hydroxide solution was added dropwise followed by 27 ml. of 30 percent/hydrogen perioxide. Stirring was stopped after one-half hr. and the organic layer was separated and washed once with 100 ml. of brine. The combined aqueous layers were extracted 3 times with 100 ml. of ether. The organic layers were then combined, washed once with 100 ml. brine and dried over anhydrous magnesium sulfate. Removed of solvent in vacuo gave 54.0 gm. of crude material (oil). This oil was fractionally distilled two times to yield trans4-hydroxy-3-methoxycyclopentene. b.p. 38–33° at 0.05 mm.

IR spectrum in CHCl$_3$ (P.C. 76957): 3620 cm$^{-1}$ (OH), 3450 cm$^{-1}$ (OH), 1605 cm$^{-1}$ (C=C).

NMR spectrum in CDCl$_3$ (P.C. 76957): δ 5.69 (m, –CH=CH–), 4.25 (m, $-\overset{|}{\text{C}}\text{H}-\text{O}$) 3.35 (s, OCH$_3$) p.p.m.

To a solution of 3.70 gm (0.0288 mole) of trans-4-hydroxy-3-methoxymethylcyclopentene and 30 ml. of pyridine at 0° was added 5.92 gm. (0.0580 mole) of acetic anhydride and the mixture was stirred for 1 hr. at 0° and 16 hr. at 25°. The mixture was diluted with 30 ml. of water and was extracted 3 times with 30 ml. of ether. The ether extracts were washed twice with 30 ml. of 2N sulfuric acid, once with 30 ml. of saturated aqueous sodium bicarbonate, once with 30 ml. of brine, and was dried over anhydrous magnesium sulfate. Removal of solvent in vacuo and distillation (b.p. 87–88 at 11 mm) afforded trans-4-acetoxy-3-methoxymethylcyclopentene.

IR spectrum in CDCl$_3$ (P.C. 77333): 1730 cm$^{-1}$ (C=O), 1605 cm$^{-1}$ (C=C).

NMR spectrum in CDCl$_3$ (P.C. 77333): δ 5.74 (s, –CH=CH–) 5.18

(doublet of triplets, J$_d$=7Hz, J$_t$=3Hz–$\overset{|}{\text{C}}\text{H}-\text{O}$), 3.40 (d, J=6Hz, $-\overset{|}{\text{C}}\text{H}_2-\text{O}$).

3.32 (s, –OCH$_3$), 2.03 (s, CH$_3$CO) ppm.

EXAMPLE 4

A mixture of 3.40 g. (0.0243 mole) of trans-4-acetoxy- 3-methylcyclopentene and 0.390 g. (0.0030 mole) of methyl diformylacetate was irradiated in a Pyrex tube for 109 hr. using a 450 watt, Hanovia mercury lamp. Trans-4-acetoxy-3-methylcyclopentene was recovered by distillation (b.p. 47°–50° at 11 mm). The product was further purified by preparative TLC.

IR spectrum, neat liquid: 3400 cm$^{-1}$ (OH), 1730 cm$^{-1}$ (C=O), 1705 cm$^{-1}$ (C=O), 1635 cm$^{-1}$ (C=C).

NMR spectrum in CDCl$_3$(P.C. 78195): δ 6.67 (s, –CH=), 6.64 (s, –CH=), 3.73 (s, CO$_2$CH$_3$), 2.05 (s, CH$_3$CO), 2.02 (s, CH$_3$CO), 1.15 (d, J=7Hz, CH$_3$) ppm.

The starting material trans-4-acetoxy-3-methylcyclopentene was prepared as follows:

To a solution of 212.9 gm. (1.500 mole) of methyl iodide in 200 ml. of tetrahydrofuran at −70° was added ca. 1.0 mole of cyclopentadienyl sodium (23.0 gm. sodium, 70 gm. cyclopentadiene) in 150 ml. of tetrahydrofuran over a 1 hr. period. The mixture was stirred at −70° for 2 hr. yielding 5-methylcyclopentadiene. Then 220 ml. (0.220 mole) of 1M borane in tetrahydrofuran was added dropwise. The mixture was stirred for 4 hrs. at −40° and for 16 hrs. at room temperature. The solution was cooled to −20° and 67 ml. of 3N aqueous sodium hydroxide was added followed by 81 ml. of 30 percent hydrogen peroxide. Sodium chloride (25gm.) was added to the mixture and the organic layer was separated. The aqueous layer was extracted 3 times with 100 ml. of ether. The organic extracts were combined and washed three times with saturated aqueous sodium bisulfite, washed once with 100 ml. of water, once by 100 ml. of brine, and dried over anhydrous magnesium sulfate. Removal of solvent in vacuo and two fractional distillations afforded trans-4-hydroxy-3-methylcyclopentene, b.p. 51°–55° at 11 mm.

To a solution of 3.50 gm. (0.0357 mole) of trans-4-hydroxy-3-methylcyclopentene and 25 ml. of pyridine at 0° was added 4.37 gm. (0.0428 mole) of acetic anhydride and the mixture was stirred for 1 hr. at 0° and 17 hrs. at room temperature. The solution was diluted with an equal volume of water, and was extracted 3 times with 100 ml. of ether. The ether layers were washed twice with 100 ml. of 5 percent sulfuric acid solution, once with 100 ml. of saturated aqueous sodium bicarbonate, once with 100 ml. of brine, and was dried over anhydrous magnesium sulfate. Removal of solvent in vacuo and distillation afforded trans-4-acetoxy-3-methylcyclopentene (b.p. 47°–49° at 11 mm).

IR spectrum in CHCl$_3$ (P.C. 78055): 1730 cm$^{-1}$ (C=O), 1605 cm$^{-1}$ (C=C).

NMR spectrum in CDCl$_3$ (P.C. 78055): 5.67 (S, –CH=CH–), 4.95

(doublet of triplets, J$_d$=7Hz, J$_t$=3Hz, $-\overset{|}{\text{C}}\text{H}-\text{O}$), 2.02 (S, CH$_3$CO), and 1.08 (d, J=7H, CH$_3$) ppm.

EXAMPLE 5

A solution of 0.031 g. (0.00012 mole) of 6-acetoxy-1,4aα,5, 6,7,7aα,hexahydro-1-hydroxycyclopenta[c]pyran-4-carboxylic acid, methyl ester, 12 ml. of methanol and 0.005 g. of p-toluenesulfonic acid monohydrate was stirred for 5 hr. at room temperature. The methanol was removed in vacuo and the residue was taken in 20 ml. of ether. The ether solution was washed with 7 ml. of saturated aqueous sodium bicarbonate and 7 ml. of water. The washes were extracted with 20 ml. of ether. The combined ether layers were washed once with 10 ml. of brine, dried over anhydrous magnesium sulfate and concentrated under reduced pressure. The product was further purified by preparative TLC to yield 6-acetoxy-1,4aα,5,6,7,7aα-hexahydro-1-methoxy-cyclopenta[c]pyran-4-carboxylic acid, methyl ester.

IR spectrum, neat liquid: 1735 cm$^{-1}$ (C=O), 1710 cm$^{-1}$ (C=O), 1635 cm$^{-1}$ (C=C).

NMR spectrum in CDCl$_3$ (P.C. 78066): δ 7.46 (S, —CH=), 7.41 (S, –CH=), 5.15 (m, –CHOCOCH$_3$),

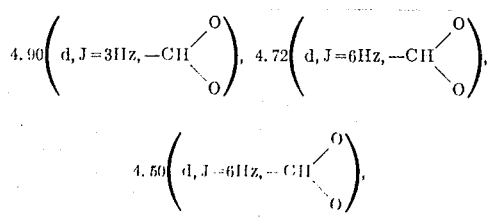

3.70 (s, CO$_2$CH$_3$), 3.54 (s, OCH$_3$), 3.52 (s, OCH$_3$), 3.41 (s, OCH$_3$), 2.02 (s, CH$_3$CO), 1.98 (s, CH$_3$CO) ppm.

EXAMPLE 6

A mixture of 20.78 g. (0.0696 mole) of 1,4aα,5,6,7,7aα-hexahydro-1-hydroxy-6-(2-tetrahydropyranyloxy)cyclopenta[c]pyran -4-carboxylic acid, methyl ester, 600 ml. of methanol and 6.0 g. of amberlite IR-120 cation exchange resin (acid form) was stirred for 67 hr. at room temperature. The mixture was filtered free or resin and was concentrated in vacuo. The residue was dissolved in 600 ml. of methanol, 6.0 g. of amberlite IR-120 resin (acid form) was added and the mixture was stirred at room temperature for an additional 58 hr. The resin was removed by filtration and the filtrate was concentrated in vacuo. The residue was dissolved in 500 ml. of ether, and was washed twice with 100 ml. of saturated aqueous sodium bicarbonate. The aqueous layers were extracted with two 100 ml. portions of ether. The combined organic extracts were washed with 150 ml. of brine, dried over anhydrous magnesium sulfate and concentrated under reduced pressure yielding 1,4aα,5,6,7,7aα-hexahydro-6-hydroxy-1-methoxycyclopenta[c]pyran-4-carboxylic acid, methyl ester. A sample distilled at 148°–150° at 0.03 mm (bath temperature).

IR spectrum in CHCl$_3$ (P.C. 75927): 3620 cm$^{-1}$ (OH), 3500 cm$^{-1}$ (OH), 1705 cm$^{-1}$ (C=O), 1638 cm$^{-1}$ (C=C).

NMR spectrum in CDCl$_3$ (P.C. 75927): 7.46 (s, –CH=), 3.70 (s, CO$_2$CH$_3$), 3.54 (s, OCH$_3$), 3.51 (s, OCH$_3$), 3.42 (s, OCH$_3$)ppm.

EXAMPLE 7

A mixture of 21.00 g. (0.0704 mole) of 1,4aα-5,6,7,7aα-hexahydro-1-hydroxy-6-(2-tetrahydropyranyloxy)-cyclopenta[c]pyran -4-carboxylic acid, methyl ester, 700 ml. of methanol and 0.5 g. of boron trifluoride etherate was stirred at 25° for 48 hr. The solvent was removed in vacuo and the residue was taken up in 500 ml. of ether, and washed with 200 ml. of saturated aqueous sodium bicarbonate and 200 ml. of water. The aqueous washes were extracted with 200 ml. of ether. The combined ether layers were washed with 200 ml. of brine, dried over anhydrous magnesium sulfate, and concentrated in vacuo to yield 1,4aα,5,6,7,7aα-hexahydro-6-hydroxy-1-methoxy-cyclopenta[c]pyran-4-carboxylic acid, methyl ester.

EXAMPLE 8

A mixture of 0.059 g. (0.000197 mole) of 1,4aα,5,6,7,7aα-hexahydro-1-hydroxy-6-(2-tetrahydropyranyloxy)-cyclopenta[c]-pyran-4-carboxylic acid, methyl ester, 25 ml. of methanol and 14 mg.of p-toluenesulfonic acid monohydrate was stirred for 16 hr. at room temperature. The methanol was removed in vacuo and the residue was taken up in 40 ml. of ether, washed with 20 ml. of saturated aqueous sodium bicarbonate and 20 ml. of water. The aqueous washes were extracted with 25 ml. of ether. The combined ether layers were washed with 20 ml. of brine, dried over anhydrous magnesium sulfate and concentrated in vacuo to yield 1,4aα,5,6,7,7aα-hexahydro-6-hydroxy-1-methoxy-cyclopenta-[c]pyran-4-carboxylic acid, methyl ester.

EXAMPLE 9

A mixture of 0.056 g. (0.000187 mole) of 1,4aα,5,6,7,7aα-hexahydro-1-hydroxy-6-(2-tetrahydropyranyloxy)-cyclopenta[c]pyran-4-carboxylic acid, methyl ester, 20 ml. of methanol and 0.020 g. of concentrated sulfuric acid was stirred for 17 hr. at room temperature. The solvent was removed in vacuo and the residue was taken up in 30 ml. of ether. The solution was washed with 20 ml. of saturated aqueous sodium bicarbonate and 20 ml. of water. The aqueous washes were extracted with 20 ml. of ether. The combined ether layers were washed with 20 ml. of brine, dried over anhydrous magnesium sulfate and concentrated in vacuo to yield 1,4aα,5,6,7,7aα-hexahydro-6-hydroxy-1-methoxy-cyclopenta[c]pyran-4-carboxylic acid, methyl ester.

EXAMPLE 10

A mixture of 0.193 gm. (0.000754 mole) of 6-acetoxy-1,4aα, 5,6,7,7aα,hexahydro-1-hydroxycyclopenta[c]pyran-4-carboxylic acid, methyl ester, 60 ml. of methanol and 0.020 gm. of p-toluenesulfonic acid monohydrate was stirred at 25° for 142 hrs. The methanol was removed in vacuo and the residue was taken up in 20 ml. of ether. The ether solution was washed once with 10 ml. of saturated aqueous sodium bicarbonate and 10 ml. of water.

The aqueous washes were extracted with 20 ml. of ether. The combined organic layers were washed with 20 ml. of brine, dried over anhydrous magnesium sulfate. Removal of solvent gave 1,4aα,5,6,7,7aα-hexahydro-6-hydroxy-1-methoxycyclopenta[c]-pyran-4-carboxylic acid, methyl ester.

EXAMPLE 11

A mixture of 0.060 g. (0.00020 mole) of 6β-acetoxy-1,4aα, 5,6,7,7aα-hexahydro-1-hydroxy-7α-methoxymethylcyclopenta[c]pyran -4-carboxylic acid, methyl ester, 10 ml. of methanol and 0.010 gm. of p-toluenesulfonic acid monohydrate was stirred at room temperature for 110 hrs. The methanol was removed in vacuo and the residue was dissolved in 50 ml. of ether. The ether solution was washed with 25 ml. of saturated aqueous sodium bicarbonate, with 25 ml. of brine, and dried over anhydrous magnesium sulfate. Removal of solvent in vacuo gave 1,4aα,5,6,7,7aα-hexahydro-6β-hydroxy-1-methoxy-7α-methoxymethylcyclopenta[c]pyran-4-carboxylic acid, methyl ester.

IR spectrum of the neat liquid: 3450 cm$^{-1}$ (OH), 1705 cm$^{-1}$ (C=O), 1635 cm$^{-1}$ (C=C).

NMR spectrum in CDCl$_3$ (P.C. 78061): δ 7.40 (s, –CH=), 3.71 (s, CO$_2$CH$_3$), 3.53 (s, OCH$_3$), 3.52 (s, OCH$_3$), 3.50 (s, OCH$_3$), 3.36 (s, CH$_2$OCH$_3$) ppm.

EXAMPLE 12

To a solution of 86.3 g. (0.334 mole) of dipyridine chromium (VI) oxide in 1700 ml. of methylene chloride at 0° was added 7.63 g. (0.0334 mole) of epimeric 1,4aα,5,6,7,7aα-hexahydro-6-hydroxy-1-methoxycyclopenta[c]pyran-4-carboxylic acid, methyl esters, in 80 ml. of methylene chloride. The mixture was stirred at 0° for 2 hr. and at room temperature for 1 hr. The reaction mixture was then eluted through a silica gel column. Removal of solvent in vacuo and distillation of the residue gave a 3:1 mixture of 1,4aα,5,6,7,7aα-hexahydro-1α-methoxy-6-oxocyclopenta[c]pyran-4-carboxylic acid, methyl ester (Isomer A) and 1,4aα,5,6,7,7aα-hexahydro-1β-methoxy-6-oxocyclopenta[c]pyran-4-carboxylic acid, methyl ester (Isomer B).

A sample of the major isomer A (m.p. 85°–87°) was separated by repeated recrystallization from ether.

IR spectrum in CHCl$_3$ (P.C. 76610): 1742 cm$^{-1}$ (C=O), 1705 cm$^{-1}$ (C=O), 1638 cm$^{-1}$ (C=C).

NMR spectrum in CDCl$_3$ (P.C. 76610): δ 7.50 (d, J=1Hz, –CH=),

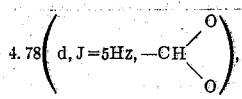

3.72 (s, CO$_2$CH$_3$), 3.53 (s, OCH$_3$) ppm.

A sample of Isomer B was separated by preparative TLC.

IR spectrum in CHCl$_3$ (P.C. 77287): 1740 cm$^{-1}$ (C=O), 1705 cm$^{-1}$ (C=O), 1635 cm$^{-1}$ (C=C). NMR spectrum in CDCl$_3$ (P.C. 77287): δ 7.53 (d, J=1Hz, –CH=),

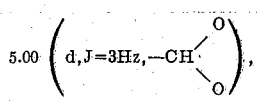

3.72 (s, CO$_2$CH$_3$), 3.42 (s, OCH$_3$) ppm.

EXAMPLE 13

A mixture of 0.509 g. (0.00222 mole) of epimeric 1,4aα,5,6,7,7aα-hexahydro-6-hydroxy-1-methoxycyclopenta[c]pyran-4-carboxylic acid, methyl esters in 5 ml. of acetone at 0° was treated with 0.62 ml. of 2.67 M chromium trioxide in 40 percent aqueous sulfuric acid for 10 minutes. The excess oxidant was destroyed with 1 ml. of 2-propanol. The mixture was diluted with 5 ml. of water which was extracted three times with 30 ml. of ether. The ether layers were washed twice with 20 ml. of saturated aqueous sodium bicarbonate, once with 20 ml. of brine and dried over anhydrous magnesium sulfate. Removal of solvent in vacuo afforded 1,4aα,5,6,7,7aα-hexahydro-1α-methoxy-6-oxocyclo-penta[c]pyran-4-carboxylic acid, methyl ester (Isomer A) and 1,4aα,5,6,7,7aα-hexahydro-1β-methoxy-6-oxocyclopenta[c]pyran-4-carboxylic acid, methyl ester (Isomer B).

EXAMPLE 14

To a solution of 0.25 g. (0.00111 mole) of epimeric 1,4aα,5,6,7,7aα-hexahydro-6-hydroxy-1-methoxycyclopenta[c]pyran-4-carboxylic acid, methyl esters in 11 ml. of methylene chloride was added 5.53 ml of a 0.2 M solution of chromium trioxide in 95:5 acetic acid-water. The two-phased solution was stirred for 16 hr. at room temperature. The mixture was diluted with 32 ml. of methylene chloride and was washed three times with saturated aqueous sodium bisulfite. The organic layer was dried over anhydrous magnesium sulfate. Removal of solvent in vacuo gave 1,4aα,5,6,7,7aα-hexahydro-1α-methoxy-6-oxocyclopenta[c]pyran-4-carboxylic acid, methyl ester (Isomer A) and 1,4aα,5,6,7,7aα-hexahydro-1β-methoxy-6-oxocyclopenta[c]pyran-4-carboxylic acid, methyl ester (Isomer B).

EXAMPLE 15

To a solution of 0.440 gm. (0.0017 mole) of dipyridine chromium oxide in 10 ml. of methylene chloride at 0°, was added 0.038 gm. (0.0014 mole) of 1,4aα,5,6,7,7aα-hexahydro-6β-hydroxy-1-methoxy-7α-methoxymethylcyclopenta[c]pyran-4-carboxylic acid, methyl ester in 2 ml. of methylene chloride. The mixture was stirred for 2 hrs. at 0°. After warming to room temperature, the mixture was eluted through a column of silica gel. Removal of solvent under vacuum gave 1,4aα,5,6,7,7aα-hexahydro-1-methoxy-7α-methoxymethyl-6-oxocyclopenta[c]pyran-4-carboxylic acid, methyl ester.

IR spectrum of the neat liquid: 1740 cm$^{-1}$ (C=O), 1705 cm$^{-1}$ (C=O), 1640 cm$^{-1}$ (C=C).

NMR spectrum in CDCl$_3$ (P.C. 78075): δ 7.50 (m, –CH=), 3.70 (s, CO$_2$CH$_3$), 3.50 (s, OCH$_3$), 3.48 (s, OCH$_3$), 3.32 (s, CH$_2$OCH$_3$) ppm.

EXAMPLE 16

To a solution of 1.170 gm. (0.00516 mole) of 1,4aα,5,6,7,7aα-hexahydro-1α-methoxy-6-oxocyclopenta[c]pyran-4-carboxylic acid, methyl ester, 50 ml. of benzene, and 5 ml. of methyl formate at 0° was added 7.6 ml. of 0.75 M sodium tert-amylate in tertamyl alcohol. The mixture was stirred at 0° for 1 hr. and at 25° for 2 hr. Glacial acetic acid was added to neutralize the solution. The mixture was washed once with 50 ml. of water. The aqueous layer was extracted three times with 50 ml. of ether. The combined organic layers were washed twice with 50 ml. of water, and 50 ml. of brine and dried over anhydrous magnesium sulfate. Removal of solvent in vacuo followed by distillation, b.p. 135°–140° at 0.05 mm (bath temperature), yielded 7-formyl-1,4aα, 5,6,7,7aα-hexahydro-1α-methoxy-6-oxocyclopenta[c]pyran-4-carboxylic acid, methyl ester.

The product was further purified by preparative TLC.

IR spectrum in CHCl₃ (P.C. 77560): 1705 cm⁻¹ (C=O) 1680 cm⁻¹ (C=O), 1635 cm⁻¹ (C=C), 1610 cm⁻¹ (C=C).

NMR spectrum in CDCl₃ (P.C. 77703): δ 11.00 (m, OH), 7.48 (d, J=2Hz, –CH=),

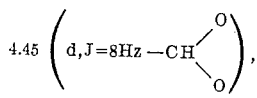

3.73 (s, CO₂CH₃), 3.58 (s, OCH₃).

EXAMPLE 17

To a solution of 0.600 gm. (0.00111 mole) of sodium methoxide in 75 ml. of benzene at 55° was added dropwise a solution of 2.28 gm. (0.00101 moles) of 1,4aα,5-,6,7,7aα-hexahydro-1α-methoxy-6-oxocyclopenta[c]pyran-4-carboxylic acid, methyl ester, 7 ml. of methyl formate, and 25 ml. of benzene and the mixture was stirred for 14 hr. at 0°. Glacial acetic acid was added to neutralize the mixture. The benzene solution was washed once with 100 ml. of water. The water wash was extracted 4 times with 50 ml. of ether. The combined organic layers were washed with 100 ml. of brine and dried over anhydrous magnesium sulfate. Removal of solvent in vacuo afforded 7-formyl-1,4aα,5,6,7,7aα-hexahydro-1α-methoxy-6-oxocyclopenta[c]pyran-4-carboxylic acid, methyl ester.

EXAMPLE 18

To a solution of 0.750 gm. (0.0295 mole) of 7-formyl-1,4aα, 5,6,7,7aα-hexahydro-1α-methoxy-6-oxocyclopenta[c]pyran-4-carboxylic acid, methyl ester and 20 ml. of methanol at 0° was added a cooled solution (0°) of 1.12 gm. (0.295 mole) of sodium borohydride in 10 ml. of methanol. The mixture was stirred for 1 hr. at 0° and cold 2N hydrochloric acid was added until the solution achieved pH 2. Then 10 ml. saturated aqueous sodium bicarbonate was added and the mixture was warmed to 25°. The solution was saturated with sodium chloride and was extracted 4 times with 40 ml. of ether. The ether layers were washed with 50 ml. of brine, dried over anhydrous magnesium sulfate and concentrated under reduced pressure to yield a 1:1 mixture of diols. The less polar (by TLC) diol 1,4aα,5,-6,7,7aα-hexahydro-6-hydroxy-7-hydroxymethyl--1α-methoxy cyclopenta[c]pyran-4-carboxylic acid, m-ethyl ester (triturated with ether, m.p.=118°-20°) was isolated by column chromatography.

IR spectrum KBr pellet (P.C. 77215): 3420 cm⁻¹ (OH), 1685 cm⁻¹ (C=O), 1630 cm⁻¹ (C=C).

NMR spectrum in CDCl₃ (P.C. 76785): δ 7.53 (s, –CH=), 4.77

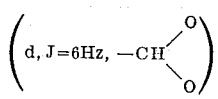

3.72 (s, CO₂CH₃), 3.53 (s, OCH₃).

The more polar diol (by TLC) 1,4aα,5,6,7,7aα-hexahydro-6-hydroxy-7-hydroxymethyl-1α-methoxycyclopenta[c]pyran-4-carboxylic acid, methyl ester was isolated by column chromatography.

IR spectrum of the neat liquid: 3500 cm⁻¹ (OH), 1700 cm⁻¹ (C=O), 1635 cm⁻¹ (C=C).

NMR spectrum in CDCl₃ (P.C. 76784): 7.49 (s, –CH=), 4.66

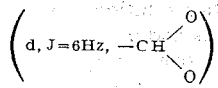

3.72 (s, CO₂CH₃), 3.53 (s, OCH₃).

EXAMPLE 19

To a solution of 1.75 g. (0.00688 mole) of 7-formyl 1,4aα, 5,6,7,7aα-hexahydro-1α-methoxy-6-oxocyclopenta[c]pyran-4-carboxylic acid, methyl ester, and 25 ml. of pyridine at 0° was added 1.32 g. (0.00690 mole) of p-toluenesulfonyl chloride in 5 ml. of pyridine. The mixture was stirred at 0° for 30 minutes and 0.687 g. (0.00763 mole) of n-butanethiol was added and the mixture was stirred for 16 hr. at room temperature. The mixture was poured into 50 ml. of 5 percent aqueous sodium hydroxide and was extracted four times with 50 ml. of ether. The combined ether layers were washed twice with 50 ml. of 6N aqueous sodium hydroxide, twice with water, twice with 50 ml. of 5 percent sulfuric acid, once with 50 ml. of saturated aqueous sodium bicarbonate solution, and once with 50 ml. of brine. The solution was dried over anhydrous magnesium sulfate and concentrated under reduced pressure to yield a crude product. The crude product was purified by preparative TLC to yield 7-n-butylthiomethylene-1,4aα,5,6,7,7aα-hexahydro-1α-methoxy-6-oxocyclopenta[c]pyran-4-carboxylic acid, methyl ester.

IR spectrum in CHCl₃ (P.C. 78176): 1700 cm⁻¹ (C=O), 1635 cm⁻¹ (C=C), 1575 cm⁻¹ (C=C).

NMR spectrum in CDCl₃ (P.C. 78176): δ 7.72 (s, –CH=), 7.60 (s, –CH=),

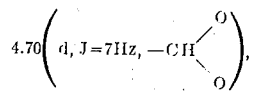

3.73 (s, CO₂CH₃), 3.63 (s, OCH₃), 3.60 (s, OCH₃), 0.96 (t, J=6Hz, CH₃) ppm.

EXAMPLE 20

A mixture of 0.327 g. (0.0010 mole) of 7-n-butylthiomethylene -1,4aα,5,6,7,7aα-hexahydro-1α-methoxy-6-oxocyclopenta[c]pyran-4-carboxylic acid, methyl ester, 30 ml. of methanol and 5.0 g. of Raney nickel (basic grade) was stirred at room temperature for 4 hr. The solution was filtered through Celite and concentrated under reduced pressure to yield a crude product. Further purification by preparative TLC yielded 1,4aα,5,6,7,7aα-hexahydro-1α-methoxy-7α-methyl-6-oxocyclopenta[c]pyran-4-carboxylic acid, methyl ester.

IR spectrum, neat liquid: 1745 cm⁻¹ (C=O), 1705 cm⁻¹ (C=O), 1640 cm⁻¹ (C=C).

NMR spectrum in CDCl₃ (P.C. 78083): δ 7.44 (s, –CH=), 4.94

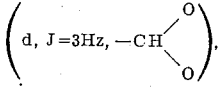

3.73 (s, CO₂CH₃), 3.53 (s, OCH₃), 2.60 (d, J=6Hz, –CH₂CO), 1.16 (d, J=7Hz, CH₃) ppm.

By using Raney nickel (neutral grade) the other epimer 1,4aα,5,6,7,7aα-hexahydro-1α-methoxy-7α-methyl-6-oxocyclopenta [c]pyran-4-carboxylic acid, methyl ester was formed.

EXAMPLE 21

A mixture of 0.200 g. (0.00074 mole) of 6β-acetoxy-1,4aα, 5,6,7,7aα-hexahydro-1-hydroxy-7α-methylcyclopenta[c]pyran-4-carboxylic acid, methyl ester, 25 ml. of methanol, and 8 mg. of p-toluenesulfonic acid monohydrate was stirred at room temperature for 112 hr. The methanol was removed in vacuo and the residue was dissolved in 50 ml. of ether. The ether solution was washed with 25 ml. of saturated aqueous sodium bicarbonate, with 25 ml. of brine, and dried over anhydrous magnesium sulfate. Removal of solvent gave 1,4aα,5,6,7,7aα-hexahydro-6β-hydroxy-1-methoxy-7α-methylcyclopenta[c]pyran-4-carboxylic acid, methyl ester.

IR spectrum in CHCl₃ (P.C. 78097): 3620 cm⁻¹ (OH), 3460 cm⁻¹ (OH), 1700 cm⁻¹ (C=O), 1635 cm⁻¹ (C=C).

NMR spectrum in CDCl₃ (P.C. 78097): δ 7.40 (s, –CH=), 3.71 (s, CO₂CH₃), 3.52 (s, OCH₃), 3.48 (s, OCH₃), 1.13 (d, J=7Hz, CH₃) ppm.

EXAMPLE 22

To a solution of 1.098 g. (0.0040 mole) of dipyridine chromium oxide in 22 ml. of methylene chloride at 0°, was added 0.097 g. (0.00040 mole) of 1,4aα,5,6,7,7aα-hexahydro-6β-hydroxy-1-methoxy-7α-methylcyclopenta[c]pyran-4-carboxylic acid, methyl ester. The mixture was stirred for 2 hr. at 0°. After warming to room temperature the mixture was eluted through a column of silica gel. Removal of solvent under vacuum gave 1,4aα,5,6,7,7aα-hexahydro-1-methoxy-7α-methyl-6-oxocyclopenta[c]pyran-4-carboxylic acid, methyl ester.

IR spectrum in CHCl₃ (P.C. 78299): 1745 cm⁻¹ (C=O), 1705 cm⁻¹ (C=O), 1640 cm⁻¹ (C=C).

NMR spectrum in CDCl₃ (P.C. 78299): δ 7.52 (s, –C-H=), 7.44 (s, –CH=),

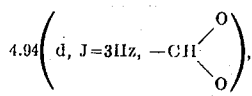

3.73 (s, CO₂CH₃), 3.54 (s, OCH₃), 2.60 (d, J=6Hz, –CH₂CO), 1.18 (d, J=7Hz, CH₃), 1.16 (d, J=7Hz, CH₃) ppm.

I claim:

1. A process for the preparation of a compound of the formula

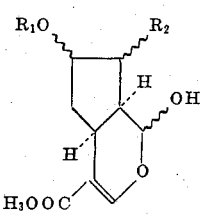

wherein R₁ is selected from the group consisting of hydrogen, lower alkanoyl, benzoyl, halobenzoyl, lower alkyl benzoyl, tolyl-lower alkyl, halophenyl lower alkyl, phenyl lower alkyl, tetrahydropyranyl, benzenesulfonyl, lower alkyl benzenesulfonyl and lower alkyl sulfonyl and R₂ is selected from the group consisting of hydrogen, lower alkyl, –CH₂–O–R₁₂, –CH₂–S–R₁₂ and –CH₂–O–SO₂–R₁₂ wherein R₁₂ is selected from the group consisting of lower alkyl, phenyl, tolyl, p-halophenyl, phenyl lower alkyl and

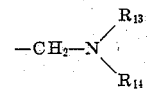

wherein 13 and R₁₄ are each selected from the group consisting of hydrogen and lower alkyl which comprises irradiating with ultraviolet light a mixture containing a compound of the formula

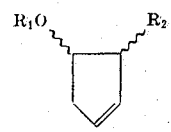

wherein R₁ and R₂ are as above and a compound of the formula

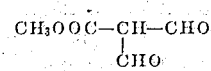

2. A process as defined in claim 1 wherein R₁ is selected from the group consisting of hydrogen, lower alkanoyl, and tetrahydropyranyl,; and R₂ is selected from the group consisting of hydrogen, –CH₂–O–lower alkyl and lower alkyl.

3. A process as defined in claim 2 wherein R₁ is selected from the group consisting of tetrahydropyranyl and acetyl and R₂ is selected from the group consisting of hydrogen, methoxymethyl and methyl.

4. A process for the preparation of a compound of the formula

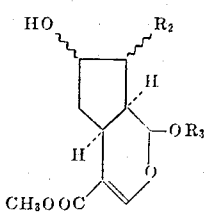

I wherein R₂ is selected from the group consisting of hydrogen, lower alkyl, –CH₂–O–R₁₂, –CH₂–S–R₁₂, –CH₂–O–SO₂–R₁₂, wherein R₁₂ is selected from the group consisting of lower alkyl, phenyl, tolyl, halophenyl, phenyl lower alkyl and

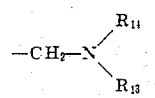

wherein R₁₃ and R₁₄ are each selected from the group consisting of hydrogen and lower alkyl and R₃ is selected from the group consisting of lower alkyl, phenyl lower alkyl and tetracetylglucopyranosyl which comprises irradiating with ultraviolet light a mixture containing a compound of the formula

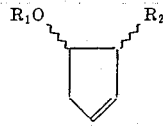

wherein $R_2$ is as above and $R_1$ is selected from the group consisting of hydrogen, lower alkanoyl, benzoyl, halobenzoyl, lower alkyl benzoyl, phenyl lower alkyl, tolyl lower alkyl, halophenyl lower alkyl, tetrahydropyranyl, benzenesulfonyl, lower alkyl benzene sulfonyl and lower alkyl sulfonyl and a compound of the formula

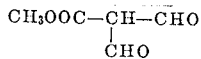

whereby to prepare a compound of the formula

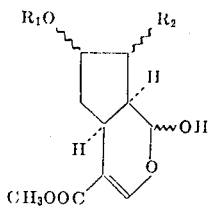

wherein $R_1$ and $R_2$ are as above treating the last-mentioned compound of the formula II in the presence of acid with a lower alkanol, a phenyl-lower alkanol or a compound which provides a tetraacetylglucopyranosyl moiety whereby to obtain the corresponding compound containing an ether group in position-1 of the formula

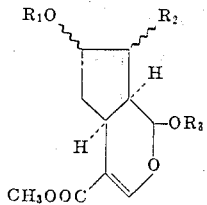

wherein $R_1$, $R_2$ and $R_3$ are as above, and if $R_1$ is other than hydrogen, removing the $R_1$ grouping with means capable of effecting removal of said grouping whereby to prepare the corresponding compound of the formula I.

5. A process as defined in claim 4 wherein $R_1$ is selected from the group consisting of hydrogen, lower alkanoyl, and tetrahydropyranyl; $R_2$ is selected from the group consisting of hydrogen, $-CH_2-O-$lower alkyl and lower alkyl and $R_3$ is lower alkyl or tetraacetylglucopyranosyl.

6. A process as defined in claim 5 wherein $R_1$ is selected from the group consisting of tetrahydropyranyl and acetyl, $R_2$ is selected from the group consisting of hydrogen, methoxymethyl and methyl and $R_3$ is selected from the group consisting of lower alkyl.

* * * * *

UNITED STATES PATENT OFFICE
CERTIFICATE OF CORRECTION

Patent No. 3,755,118             Dated August 28, 1973

Inventor(s) John J. Partridge, Jr. and Milan R. Uskokovic

It is certified that error appears in the above-identified patent and that said Letters Patent are hereby corrected as shown below:

Column 18, line 12 - Claim 1 "13" should be $$R_{13}$$

Signed and sealed this 8th day of October 1974.

(SEAL)
Attest:

McCOY M. GIBSON JR.  
Attesting Officer

C. MARSHALL DANN  
Commissioner of Patents